US011884569B2

United States Patent
Yao et al.

(10) Patent No.: US 11,884,569 B2
(45) Date of Patent: Jan. 30, 2024

(54) SYSTEM FOR BIOLOGICAL NITROGEN REMOVAL AND NEGATIVE CARBON DISCHARGE FROM WASTEWATER WITH LOW CARBON-TO-NITROGEN RATIO

(71) Applicant: BEIJING JIAOTONG UNIVERSITY, Beijing (CN)

(72) Inventors: Hong Yao, Beijing (CN); Sheng Tian, Beijing (CN); Lu Lu, Beijing (CN); Lushen Zuo, Beijing (CN)

(73) Assignee: BEIJING JIAOTONG UNIVERSITY

( * ) Notice: Subject to any disclaimer, the term of this patent is extended or adjusted under 35 U.S.C. 154(b) by 204 days.

(21) Appl. No.: 17/505,614

(22) Filed: Oct. 19, 2021

(65) Prior Publication Data

US 2022/0177342 A1 Jun. 9, 2022

(30) Foreign Application Priority Data

Dec. 4, 2020 (CN) .......................... 202011408868.7

(51) Int. Cl.
*C02F 9/00* (2023.01)
*C02F 3/00* (2023.01)
(Continued)

(52) U.S. Cl.
CPC ................ *C02F 9/00* (2013.01); *C02F 3/005* (2013.01); *C02F 3/305* (2013.01); *C02F 3/307* (2013.01);
(Continued)

(58) Field of Classification Search
CPC ...... C02F 2001/007; C02F 2201/46115; C02F 2203/006; C02F 2301/026;
(Continued)

(56) References Cited

U.S. PATENT DOCUMENTS 8,357,270 B2 * 1/2013 Gilliam .................. B01D 61/44
204/263

FOREIGN PATENT DOCUMENTS

CN 110171904 A * 8/2019 ................ C02F 1/52

OTHER PUBLICATIONS

Peng et al., CN 11071904A, English machine translation, pp. 1-10 (Year: 2019).*

* cited by examiner

*Primary Examiner* — Claire A Norris
(74) *Attorney, Agent, or Firm* — Fishman Stewart PLLC

(57) ABSTRACT

A system for biological nitrogen removal and negative carbon discharge from wastewater with low carbon-to-nitrogen ratio may include a water intake pump, a carbon capture apparatus, a carbon recovery sedimentation tank, an integrated ammonium apparatus, an autotrophic denitrification apparatus and a denitrification sedimentation tank that are connected in sequence by pipes. The carbon capture apparatus may include an anode chamber communicated with the water intake pump via a water inlet pipe and a cathode chamber communicated with the carbon recovery sedimentation tank via a first water outlet pipe. The anode and cathode chambers may be spaced apart by an ion exchange resin membrane. The anode and cathode chambers may be provided with an anode plate and a cathode plate electrically connected to positive and negative electrodes of a power source, respectively. A bottom of the cathode chamber may be provided with aerators connected to a first air compressor by a pipe.

6 Claims, 1 Drawing Sheet

(51) Int. Cl.
  *C02F 3/30* (2023.01)
  *C02F 1/00* (2023.01)
(52) U.S. Cl.
  CPC ............... *C02F 2001/007* (2013.01); *C02F 2201/46115* (2013.01); *C02F 2203/006* (2013.01); *C02F 2301/026* (2013.01); *C02F 2301/046* (2013.01); *C02F 2301/08* (2013.01)
(58) Field of Classification Search
  CPC ............ C02F 2301/046; C02F 2301/08; C02F 3/005; C02F 3/305; C02F 3/307; C02F 9/00; Y02W 10/10
  USPC ........................................................ 210/151
  See application file for complete search history.

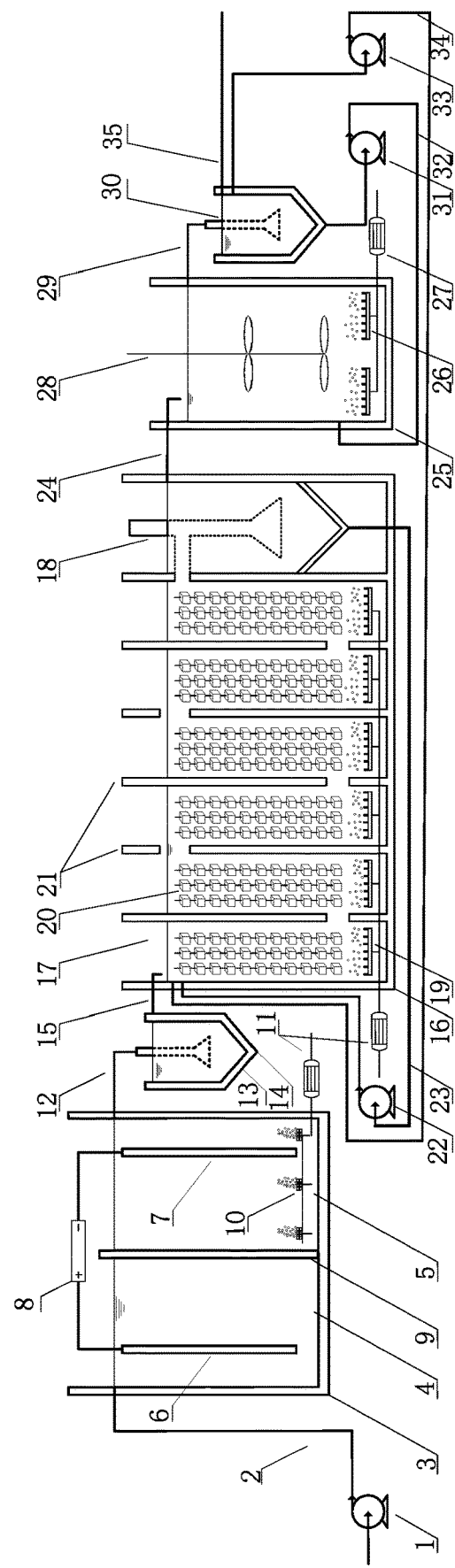

SYSTEM FOR BIOLOGICAL NITROGEN REMOVAL AND NEGATIVE CARBON DISCHARGE FROM WASTEWATER WITH LOW CARBON-TO-NITROGEN RATIO

CROSS REFERENCE TO RELATED APPLICATION

This patent application claims the benefit and priority of Chinese Patent Application No. 202011408868.7 filed on Dec. 4, 2020, the disclosure of which is incorporated by reference herein in its entirety as part of the present application.

TECHNICAL FIELD

The present disclosure relates to the field of wastewater treatment technologies, and in particular, to a system for biological nitrogen removal and negative carbon discharge from wastewater with low carbon-to-nitrogen (C/N) ratio.

BACKGROUND

With the rapid development of economy and industry in China, a great deal of nitrogen-containing industrial wastewater has been discharged into water, resulting in serious problems such as water eutrophication and ecosystem degradation in rivers and lakes. Currently, the most widely applied technology in the nitrogen removal technique for wastewater is the biological nitrogen removal. The traditional biological nitrogen removal includes the processes of nitrification and denitrification, whereas the nitrification requires a lot of aeration, and the denitrification has to depend on the sufficient carbon source. These two shortcomings limit the application of traditional biological nitrogen removal. In China, the industrial wastewater with high ammonia nitrogen, such as wastewater from the industry of chemical process of coal, the smelting industry and the electronics industry, is characterized by high ammonia nitrogen and low C/N ratio. The carbon source in the wastewater is insufficient for the denitrification, and therefore, the extra carbon source needs to be added, leading to an increase in treatment cost. Hence, it is of great significance to develop efficient and cost-efficient novel biological nitrogen removal techniques for the wastewater with low C/N ratio.

Anaerobic ammonium oxidation (Anammox), which is a novel biological nitrogen removal process with high efficiency and low consumption, has received increasing attention in the field of water treatment and has unique advantages especially in the treatment of wastewater with high ammonia nitrogen and low C/N ratio. However, in practical application, this process still suffers from many problems, for example, the autotrophic bacteria dominant in the process cannot remove carbonaceous pollutants. Besides, it would be inefficient and costly to design a dedicated biochemical process for removing chemical oxygen demand (COD) from wastewater with low carbon source. Moreover, according to the mechanism of Anammox, about 10% of total nitrogen consumed will be converted into nitrate-nitrogen. There exists a big problem that the nitrate-nitrogen is remained after performing the Anammox process for treating the high ammonia nitrogen wastewater. The increasingly stringent environmental protection indicators for total nitrogen emissions requirements are unable to meet.

SUMMARY

An objective of the present disclosure is to provide a system for biological nitrogen removal and negative carbon discharge from the wastewater with low C/N ratio, so as to solve the problems in the prior art and achieve the high-performance nitrogen removal and the high-performance negative carbon discharge from the wastewater with low C/N ratio.

To achieve the above-mentioned objective, the embodiment provides the following solution.

The present disclosure provides a system for biological nitrogen removal and negative carbon discharge from wastewater with low C/N ratio. The system including a water intake pump, a carbon capture apparatus, a carbon recovery sedimentation tank, an integrated anaerobic ammonium oxidation apparatus, an autotrophic denitrification apparatus and a denitrification sedimentation tank that are connected in sequence by means of pipes, wherein the carbon capture apparatus includes an anode chamber communicated with the water intake pump via an water inlet pipe and a cathode chamber communicated with the carbon recovery sedimentation tank via a first water outlet pipe; the anode chamber and the cathode chamber are spaced apart by an ion exchange resin membrane; the anode chamber is provided with an anode plate electrically connected to a positive electrode of a power source, and the cathode chamber is provided with a cathode plate electrically connected to a negative electrode of the power source; a bottom of the cathode chamber is provided with aerators connected to a first air compressor by means of a first pipe; the integrated anaerobic ammonium oxidation apparatus is a continuous flow baffled reactor; and the autotrophic denitrification apparatus is a completely mixed flow reactor.

Preferably, the integrated anaerobic ammonium oxidation apparatus includes a plurality of reaction compartments and a sedimentation compartment that are communicated with one another in sequence; one of the reaction compartments that is at one end of the integrated anaerobic ammonium oxidation apparatus is communicated with the carbon recovery sedimentation tank via a second water outlet pipe, and a top of one of the reaction compartments that is at an other end of the integrated anaerobic ammonium oxidation apparatus is communicated with the sedimentation compartment; adjacent two of the reaction compartments are separated by a corresponding one of a plurality of baffles; the baffles are provided with respective openings in tops or bottoms thereof, and ones of the openings in adjacent two of the baffles are different in position; each of the reaction compartments is provided with a frame, a sponge filler loaded with anaerobic ammonium oxidation sludge is fixed on the frame, and the anaerobic ammonium oxidation sludge is rich in short-cut nitrification bacteria and anaerobic ammonium bacteria; and a bottom of each of the reaction compartments is provided with a first aeration disc communicated with a second air compressor via a second pipe.

Preferably, the sedimentation compartment is a radial flow sedimentation tank; a bottom outlet of the sedimentation compartment is communicated with a feed inlet of the integrated anaerobic ammonium oxidation apparatus via a first sludge return pipe, and a first sludge return pump is disposed on the first sludge return pipe.

Preferably, a bottom of the autotrophic denitrification apparatus is provided with second aeration discs communicated with a third air compressor via a third pipe; and the autotrophic denitrification apparatus is further provided with a stirrer located above the second aeration discs.

Preferably, the integrated anaerobic ammonium oxidation apparatus is communicated with the autotrophic denitrification apparatus via a third water outlet pipe, and the autotrophic denitrification apparatus is communicated with the denitrification sedimentation tank via a fourth water outlet pipe.

Preferably, a bottom outlet of the denitrification sedimentation tank is communicated with the autotrophic denitrification apparatus via a second sludge return pipe, and a second sludge return pump is disposed on the second sludge return pipe; a fifth water outlet pipe is disposed at an overflow opening of a top of the denitrification sedimentation tank; a wastewater outlet of the top of the denitrification sedimentation tank is communicated with a feed inlet of the integrated anaerobic ammonium oxidation apparatus via a wastewater return pipe, and a wastewater return pump is disposed on the wastewater return pipe.

The present disclosure achieves the following technical effects as compared with the prior art.

The system for biological nitrogen removal and negative carbon discharge from wastewater with low C/N ratio provided in the present disclosure achieves the high-performance nitrogen removal and the high-performance negative carbon discharge from the wastewater with low C/N ratio. The front-mounted carbon capture apparatus in the system for biological nitrogen removal and negative carbon discharge from wastewater with low C/N ratio provided in the present disclosure, i.e., a front-mounted microbial electrolytic carbon capture (MECC) process, effectively removes the COD from the wastewater. As demonstrated by an experiment, the removal rate for COD can be 90% during the removal of the organic matter by the MECC process, which provides a precondition for normal operation of the subsequent Anammox process. Furthermore, this process may have a carbon capture rate of 80-93% for simulated flue gas (containing $CO_2$ at a concentration of 5-15%) from an external source. The coulombic efficiency of the reaction (the efficiency of conversion of organic matter into electric current) may be 80-82%, and the efficiency of hydrogen production at the cathode (conversion of electric current into hydrogen) may be 91-95%. This process is generally a process of energy production. Rear-mounted sulfur autotrophic denitrification in the system for biological nitrogen removal and negative carbon discharge from wastewater with low C/N ratio provided in the present disclosure uses recovered sulfureted hydrogen (generated during the front anaerobic process of high ammonia nitrogen industrial wastewater) and sulfur (the product of traditional biogas desulfurization) as an electron donor for denitrification, which enables the rapid enrichment of the sulfur autotrophic denitrifying bacteria. Thus, the nitrogen removal and the sulfur removal are simultaneously realized during the whole treatment process; and the removal rate of total nitrogen (TN) for Anammox effluent is increased. The nitrate-nitrogen removal loading reaches 1.6 kg/($m^3$·d). Moreover, the construction and operation costs of a biogas desulfurization project can be significantly reduced.

To describe the technical solutions in embodiments of the present disclosure or in the prior art more clearly, the accompanying drawings required for describing the embodiments will be briefly described below. Apparently, the accompanying drawings in the following description show merely some embodiments of the present disclosure, and a person of ordinary skill in the art may still derive other drawings from these drawings without creative efforts.

BRIEF DESCRIPTION OF THE DRAWINGS

The FIGURE is a structural diagram of a system for biological nitrogen removal and negative carbon discharge from wastewater with low C/N ratio according to an embodiment of the present disclosure.

DETAILED DESCRIPTION

List of reference numerals: 1, water intake pump; 2, water inlet pipe; 3, carbon capture apparatus; 4, anode chamber; 5, cathode chamber; 6, anode plate; 7, cathode plate; 8, power source; 9, ion exchange resin membrane; 10, aerator; 11, first air compressor; 12, first water outlet pipe; 13, carbon recovery sedimentation tank; 14, sludge discharge outlet; 15, second water outlet pipe; 16, integrated Anammox apparatus; 17, reaction compartment; 18, sedimentation compartment; 19, first aeration disc; 20, sponge filler; 21, baffle; 22, first sludge return pump; 23, first sludge return pipe; 24, third water outlet pipe; 25, autotrophic denitrification apparatus; 26, second aeration disc; 27, third air compressor; 28, stirrer; 29, fourth water outlet pipe; 30, denitrification sedimentation tank; 31, second sludge return pump; 32, second sludge return pipe; 33, wastewater return pump; 34, wastewater return pipe; 35, fifth water outlet pipe; and 36, second air compressor.

The technical solutions in the embodiments of the present disclosure will be described below clearly and completely with reference to the accompanying drawings used therein. Apparently, the described embodiments are merely a part rather than all of the embodiments of the present disclosure. All other embodiments derived from the embodiments in the present disclosure by a person of ordinary skill in the art without creative efforts shall fall within the protection scope of the present disclosure.

An objective of the present disclosure is to provide a system for biological nitrogen removal and negative carbon discharge from wastewater with low C/N ratio, so as to solve the problems in the prior art and achieve the high-performance nitrogen removal and the high-performance negative carbon discharge from wastewater with low C/N ratio.

To make the foregoing objective, features, and advantages of the present disclosure clearer and more comprehensible, the present disclosure will be further described in detail below with reference to the accompanying drawings and specific embodiments.

As shown in the FIGURE, an embodiment of the present disclosure provides a system for biological nitrogen removal and negative carbon discharge from wastewater with low C/N ratio, including an water intake pump 1, a carbon capture apparatus 3, a carbon recovery sedimentation tank 13, an integrated Anammox apparatus 16, an autotrophic denitrification apparatus 25 and a denitrification sedimentation tank 30 that are connected in sequence by means of pipes.

The carbon capture apparatus 3 includes an anode chamber 4 communicated with the water intake pump 1 via an water inlet pipe 2 and a cathode chamber 5 communicated with the carbon recovery sedimentation tank 13 via a first water outlet pipe 12. The anode chamber 4 and the cathode chamber 5 are spaced apart by an ion exchange resin membrane 9. The anode chamber 4 is provided with an anode plate 6 electrically connected to a positive electrode of a power source 8, and the cathode chamber 5 is provided with a cathode plate 7 electrically connected to a negative electrode of the power source 8. The bottom of the cathode chamber 5 is also provided with aerators 10 connected to a first air compressor 11 by means of a pipe, and the first air compressor 11 and the aerators 10 are used for aeration. Wastewater is firstly directed to the anode chamber 4 of the apparatus, and degradation of organic matter in the wastewater is performed by electrically active bacteria (EAB) growing on an anodic bioelectrode, which generates electrons and $H^+$. Meanwhile, an industrial mineral waste is added to the anode chamber 4, and the metal ions ($Ca^{2+}$, $Mg^{2+}$, etc.) released by the industrial mineral waste can be dissolved by an anolyte rich in $H^+$. Then, the wastewater flows into the cathode chamber 5 through the ion exchange resin membrane 9. Electrons are collected by the anode and transferred to the cathode plate 7 via an external circuit for the reduction reaction of water to produce $H^2$ and $OH^-$. Metal ions migrate to a catholyte through an intermediate membrane and bind to $OH^-$ to form metal hydroxides. The resulting metal hydroxides are capable of absorbing $CO^2$ from aeration and converting it into stable carbonate precipitate, thereby realizing carbon capture.

The carbon recovery sedimentation tank 13 is a radial flow sedimentation tank. Carbonates produced in the carbon recovery sedimentation tank 13 are deposited at the bottom and are collected via a sludge discharge outlet 14. The supernatant in an upper portion of the carbon recovery sedimentation tank 13 flows into the integrated Anammox apparatus 16 via a second water outlet pipe 15.

The integrated Anammox apparatus 16 is a continuous flow baffled reactor. The integrated Anammox apparatus 16 includes six reaction compartments 17 and a single sedimentation compartment 18 that are communicated with one another in sequence. The reaction compartment 17 at the leftmost end is communicated with the carbon recovery sedimentation tank 13 via the second water outlet pipe 15, whereas a top of the reaction compartment 17 at the rightmost end is communicated with the sedimentation compartment 18. Two adjacent reaction compartments 17 are separated by a baffle 21. The baffles 21 have respective openings in the tops or bottoms thereof, and ones of the openings in two adjacent baffles 21 are different in position. Thus, the up-and-down reverse flow of water in the reactor is realized. A frame is disposed in each of the reaction compartments 17, and a sponge filler 20 loaded with Anammox sludge is fixed on the frame, and the Anammox sludge is rich in short-cut nitrification bacteria and Anammox bacteria. The short-cut nitrification bacteria partially convert the ammonia nitrogen in wastewater into nitrite nitrogen by utilizing $O^2$ provided by the aeration. The Anammox bacteria use the ammonia nitrogen and the nitrite nitrogen as reaction substrate to produce nitrogen which is discharged from the top of the reactor. Thus, the high-efficiency removal of nitrogenous pollutants is achieved while approximate 10% of nitrate-nitrogen is produced. A first aeration disc 19 is disposed at the bottom of each reaction compartment 17 and communicated with a second air compressor 36 via a pipe.

The sedimentation compartment 18 is a radial flow sedimentation tank. A bottom outlet of the sedimentation compartment 18 is communicated with a feed inlet of the integrated Anammox apparatus 16 via a first sludge return pipe 23, and a first sludge return pump 22 is disposed on the first sludge return pipe 23. The sludge at the bottom of the sedimentation compartment 18 is pumped back in a reflux ratio of 100-150% to the inlet of the integrated Anammox apparatus 16 by the sludge return pump through the sludge return pipe, while the supernatant overflows to a third water outlet pipe 24 and enters into the autotrophic denitrification apparatus 25.

The autotrophic denitrification apparatus 25 is a completely mixed flow reactor. The autotrophic denitrification apparatus 25 is the completely mixed flow reactor. Second aeration discs 26 are disposed at the bottom of the autotrophic denitrification apparatus 25 and communicated with a third air compressor 27 via a pipe. A stirrer 28 located above the second aeration discs 26 is further disposed within the autotrophic denitrification apparatus 25. Dissolved oxygen in the autotrophic denitrification apparatus 25 is controlled to be 0.5 mg/L (anoxic condition) by micro-aeration and stirring. The sludge in the autotrophic denitrification apparatus 25 mainly contains autotrophic denitrifying bacteria. The autotrophic denitrifying bacteria can deoxidize the nitrate-nitrogen produced by Anammox into nitrogen for emission, by using inorganic carbon such as $HCO_3^-$ and $CO_3^{2-}$ as carbon source under the anoxic condition. Thus, a higher nitrogen removal rate is achieved. The water is flows out of the top of the autotrophic denitrification apparatus 25 and enters into the denitrification sedimentation tank 30 through a fourth water outlet pipe 29.

A bottom outlet of the denitrification sedimentation tank 30 is communicated with the autotrophic denitrification apparatus 25 via a second sludge return pipe 32, and a second sludge return pump 31 is disposed on the second sludge return pipe 32. A fifth water outlet pipe 35 is disposed at a top overflow opening of the denitrification sedimentation tank 30. A wastewater outlet in the top of the denitrification sedimentation tank 30 is communicated with the feed inlet of the integrated Anammox apparatus 16 via a wastewater return pipe 34, and a wastewater return pump 33 is disposed on the wastewater return pipe 34. The separation of sludge from wastewater is carried out in the denitrification sedimentation tank 30, and the sludge at the bottom is pumped back in a reflux ratio of 100-150% to the autotrophic denitrification apparatus 25 by the second sludge return pump 31 through the second sludge return pipe 32. The treated wastewater is partially pumped back in a reflux ratio of 300-500% to the integrated Anammox apparatus 16 at the first stage by the wastewater return pump 33 through the wastewater return pipe 34 disposed at the top of the denitrification sedimentation tank 30. In this way, the water quality in the reactor at the biochemical stage is well homogenized, the formation of free ammonia due to excessively high ammonia nitrogen can be avoided, the activity of the functional bacterial in the integrated Anammox reactor at the first stage is inhibited, and the impact of water quality change on the Anammox process is reduced based on a high return ratio. The supernatant at the top of the denitrification sedimentation tank 30 is discharged by overflowing to the fifth water outlet pipe 35.

The front-mounted carbon capture apparatus 3 in the system for biological nitrogen removal and negative carbon discharge from wastewater with low C/N ratio provided in this embodiment, i.e., a front-mounted MECC process, effectively removes the COD from the wastewater. As demonstrated by an experiment, the removal rate for COD can be 90% during the removal of the organic matter by the MECC process, which provides a precondition for normal operation of the subsequent Anammox process. Furthermore, this process may have a carbon capture rate of 80-93% for simulated flue gas (containing $CO_2$ at a concentration of 5-15%) from an external source. The coulombic efficiency of the reaction (the efficiency of conversion of organic matter into electric current) may be 80-82%, and the efficiency of hydrogen production at the cathode (conversion of electric current into hydrogen) may be 91-95%. This process is generally a process of energy production.

In a specific experiment conducted under the following conditions: the external voltage of an MECC apparatus of 0.8 V, the wastewater COD (using sodium acetate as primary organic matter source) of 620 mg/L, and electrical conductivity of 7.16 mS/cm, cations were supplemented by $CaSiO_3$ solution (a concentration of $CaSiO_3$ solution is 1 g of $CaSiO_3$ per 50 ml of deionized water). The cationic solution was supplemented every 6 hours. $CO_2$ is provided by air and directed to the reactor by the aerators at a flow rate of 120 ml/min. The pH value at the anode of the reactor is controlled within a range of 7.1-7.8, whereas the pH value at the cathode is controlled within a range of 8.2-9.4. Under such conditions, the COD removal rate of the apparatus is 86%, and the COD in the effluent was below 100 mg/L. The concentration of $CO_2$ in the inlet air is 8.0 mmol/L and the concentration of $CO_2$ in the outlet air is 0.64 mmol/L, and therefore, the $CO_2$ capture rate reached 92%. Based on the calculation of hydrogen yield of 90%, the net energy output of MECC is 11.3 kJ/g COD after the electric energy consumed is deducted. Thus, the negative emission of carbonaceous pollutants is achieved, and the energy was recovered by making full use of COD in wastewater.

Rear-mounted sulfur autotrophic denitrification in the system for biological nitrogen removal and negative carbon discharge from wastewater with low C/N ratio provided in the present disclosure uses recovered sulfureted hydrogen (generated during the front anaerobic process of high ammonia nitrogen industrial wastewater) and sulfur (the product of traditional biogas desulfurization) as an electron donor for denitrification, which enables the rapid enrichment of the sulfur autotrophic denitrifying bacteria. Thus, the nitrogen removal and the sulfur removal are simultaneously realized during the whole treatment process; and the removal rate of total nitrogen (TN) for Anammox effluent is increased. The nitrate-nitrogen removal loading reaches 1.6 kg/($m^3 \cdot d$). Moreover, the construction and operation costs of a biogas desulfurization project can be significantly reduced.

In a specific experiment, 5 g/L $Na_2S_2O_3$ is used as sulfur source, and 2 g/L $KNO_3$ is used to provide nitrate-nitrogen. Reaction conditions are controlled at the temperature of 30° C., pH value of 7.5, dissolved oxygen of below 0.2 mg/L. Anaerobic sludge is subjected to the domestication for about 20-30 days, and a nitrate-nitrogen removal loading is up to 1.6 kg/($m^3 \cdot d$). Rapid domestication of the sulfur autotrophic sludge was cooperated with the integrated Anammox process, so the nitrate-nitrogen was present at a concentration of 30-40 mg/L in the effluent from the integrated Anammox reactor, and at a concentration of <3 mg/L after being treated by the sulfur-based autotrophic denitrification (SAD) reactor, which has a removal rate of up to 90%. The whole process achieves an ammonia nitrogen removal loading of up to 0.35 kg N/($m^3 \cdot d$). The removal rates of nitrate-nitrogen and nitrite nitrogen at the stable stage are ranged from 86.1% to 100% and from 96.4% to 100%, respectively. The traditional Anammox process can be improved to a total nitrogen loading of 0.3-0.45 kg/($m^3 \cdot d$).

In the description of the present disclosure, it should be noted that orientations or position relationships indicated by terms "top", "bottom", etc. are orientations or position relationships as shown in the drawings, and these terms are just used to facilitate description of the present disclosure and simplify the description, but not to indicate or imply that the mentioned apparatus or elements must have a specific orientation and must be established and operated in a specific orientation, and thus, these terms cannot be understood as a limitation to the present disclosure. Moreover, the terms such as "first" and "second" are used herein only for the purpose of description and cannot not be construed as indicating or implying relative importance.

Specific examples are used in this description for illustration of the principles and embodiments of the present disclosure. The description of the embodiments is merely used to help understand the method and its core principles of the present disclosure. In addition, a person skilled in the art can make various modifications to the specific embodiments and application scope in accordance with the idea of the present disclosure. In conclusion, the content of this specification should not be construed as a limitation to the present disclosure.

What is claimed is:

1. A system for biological nitrogen removal and negative carbon discharge from wastewater with low carbon-to-nitrogen ratio, the system comprising:
a water intake pump, a carbon capture apparatus, a carbon recovery sedimentation tank, an integrated anaerobic ammonium oxidation apparatus, an autotrophic denitrification apparatus and a denitrification sedimentation tank that are connected in sequence via pipes;
wherein the carbon capture apparatus comprises an anode chamber communicated with the water intake pump via a water inlet pipe of the pipes and a cathode chamber communicated with the carbon recovery sedimentation tank via a first water outlet pipe of the pipes; the anode chamber and the cathode chamber are spaced apart by an ion exchange resin membrane; the anode chamber is provided with an anode plate electrically connected to a positive electrode of a power source, and the cathode chamber is provided with a cathode plate electrically connected to a negative electrode of the power source; a bottom of the cathode chamber is provided with aerators connected to a first air compressor by means of a first pipe of the pipes; the integrated anaerobic ammonium oxidation apparatus is a continuous flow baffled reactor; and the autotrophic denitrification apparatus is a completely mixed flow reactor.

2. The system for biological nitrogen removal and negative carbon discharge from wastewater with low carbon-to-nitrogen ratio according to claim 1, wherein the integrated anaerobic ammonium oxidation apparatus comprises a plurality of reaction compartments and a sedimentation compartment that are communicated with one another in sequence; one of the reaction compartments that is at one end of the integrated anaerobic ammonium oxidation apparatus is communicated with the carbon recovery sedimentation tank via a second water outlet pipe of the pipes, and a top of one of the reaction compartments that is at an other end of the integrated anaerobic ammonium oxidation apparatus is communicated with the sedimentation compartment; adjacent two of the reaction compartments are separated by a corresponding one of a plurality of baffles; the baffles are provided with respective openings in tops or bottoms thereof, and ones of the openings in adjacent two of the baffles are different in position; each of the reaction compartments is provided with a frame, a sponge filler loaded with anaerobic ammonium oxidation sludge is fixed on the frame, and the anaerobic ammonium oxidation sludge contains short-cut nitrification bacteria and anaerobic ammonium bacteria; and a bottom of each of the reaction compartments is provided with a first aeration disc communicated with a second air compressor via a second pipe of the pipes.

3. The system for biological nitrogen removal and negative carbon discharge from wastewater with low carbon-to-nitrogen ratio according to claim 2, wherein the sedimentation compartment is a radial flow sedimentation tank; a bottom outlet of the sedimentation compartment is communicated with a feed inlet of the integrated anaerobic ammonium oxidation apparatus via a first sludge return pipe of the pipes, and a first sludge return pump is disposed on the first sludge return pipe.

4. The system for biological nitrogen removal and negative carbon discharge from wastewater with low carbon-to-nitrogen ratio according to claim 1, wherein a bottom of the autotrophic denitrification apparatus is provided with second aeration discs communicated with a third air compressor via a third pipe of the pipes; and the autotrophic denitrification apparatus is further provided with a stirrer located above the second aeration discs.

5. The system for biological nitrogen removal and negative carbon discharge from wastewater with low carbon-to-nitrogen ratio according to claim 1, wherein the integrated anaerobic ammonium oxidation apparatus is communicated with the autotrophic denitrification apparatus via a third water outlet pipe of the pipes, and the autotrophic denitrification apparatus is communicated with the denitrification sedimentation tank via a fourth water outlet pipe of the pipes.

6. The system for biological nitrogen removal and negative carbon discharge from wastewater with low carbon-to-nitrogen ratio according to claim 1, wherein a bottom outlet of the denitrification sedimentation tank is communicated with the autotrophic denitrification apparatus via a second sludge return pipe of the pipes, and a second sludge return pump is disposed on the second sludge return pipe; a fifth water outlet pipe of the pipes is disposed at an overflow opening of a top of the denitrification sedimentation tank; a wastewater outlet of the top of the denitrification sedimentation tank is communicated with a feed inlet of the integrated anaerobic ammonium oxidation apparatus via a wastewater return pipe of the pipes, and a wastewater return pump is disposed on the wastewater return pipe.

* * * * *